(12) United States Patent
Clare, Jr.

(10) Patent No.: US 7,069,946 B2
(45) Date of Patent: Jul. 4, 2006

(54) SLOW-RELEASE CHECK VALVE

(76) Inventor: Edward I. Clare, Jr., 3868 114th St., Meriden, KS (US) 66512

( * ) Notice: Subject to any disclaimer, the term of this patent is extended or adjusted under 35 U.S.C. 154(b) by 98 days.

(21) Appl. No.: 10/797,885

(22) Filed: Mar. 10, 2004

(65) Prior Publication Data

US 2004/0244842 A1 Dec. 9, 2004

Related U.S. Application Data

(60) Provisional application No. 60/476,626, filed on Jun. 9, 2003.

(51) Int. Cl.
*F16K 15/04* (2006.01)
(52) U.S. Cl. .................. 137/539; 137/513.7; 137/515.5
(58) Field of Classification Search ............. 137/513.3, 137/513.5, 513.7, 515, 515.5, 539
See application file for complete search history.

(56) References Cited

U.S. PATENT DOCUMENTS 2,761,469 A * 9/1956 Hansen ................. 137/614.05
2,929,399 A * 3/1960 Magowan, Jr. .......... 137/513.7
3,901,475 A * 8/1975 Dreibelbis ................. 251/360
5,331,999 A * 7/1994 Jorgensen ................ 137/513.5

* cited by examiner

*Primary Examiner*—Ramesh Krishnamurthy
(74) *Attorney, Agent, or Firm*—Mark Brown

(57) ABSTRACT

A slow-release check valve for a pneumatic system including a compressed gas source and a pneumatic device includes a body with a proximal, supply end and a distal, power end. Supply and power couplings are mounted on the body supply and power ends respectively and are adapted for coupling with a compressed gas source and a pneumatic device respectively. The body includes a passage with a frusto-conical configuration with a minimum-diameter supply end adjacent to the supply coupling and a maximum-diameter power end adjacent to the power coupling. A ball is movably located within the passage and engages the body in a closed position. The ball is biased towards its closed position by a spring. For power operation the ball is in an open position whereby gas flows around same. Disconnecting the hose causes the ball to move to its closed position and allows compressed gas to slowly dissipate from the disconnected hose whereby fishtailing is avoided.

4 Claims, 3 Drawing Sheets

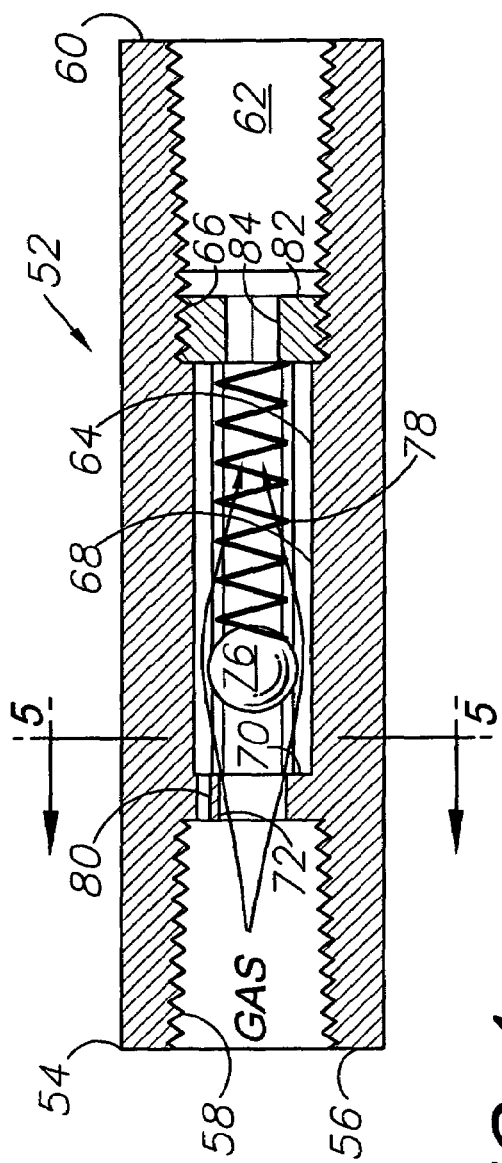
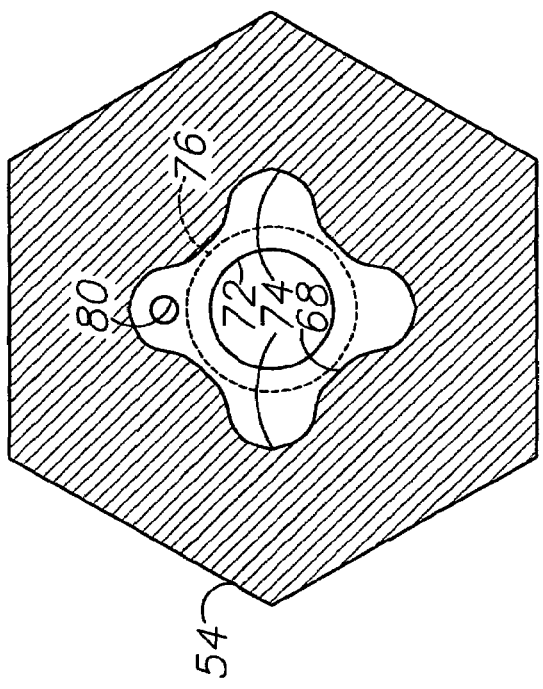
FIG. 4
FIG. 5

SLOW-RELEASE CHECK VALVE

CROSS-REFERENCE TO RELATED APPLICATION

This application claims the benefit of U.S. provisional application No. 60/476,626, filed Jun. 9, 2003, which is incorporated herein by reference.

BACKGROUND OF THE INVENTION

1. Field of the Invention

The present invention relates generally to pneumatic equipment, and in particular to a slow-release check valve for a compressor hose.

2. Description of the Related Art

Various equipment systems include pneumatic components. For example, pneumatic tools comprise an important class of manufacturing, construction, maintenance and repair tooling. A typical system includes a compressor, one or more pneumatic tools and a respective flexible hose connecting each tool to the compressed gas source. In addition to ambient air, other gases, such as nitrogen, are suitable in pneumatic power applications.

In manufacturing, construction, maintenance and repair operations that use pneumatic tooling, the connecting hoses are often relatively long in order to accommodate freedom of movement by the workers. The tools are thus somewhat portable, although they remain tethered to the compressed gas source by the connecting hoses.

A common problem associated with such connecting hoses relates to their tendency to "fishtail" when disconnected. Pneumatic hoses are particularly susceptible to fishtailing when they are equipped with the quick-disconnect type of coupling that operates by axially sliding a sleeve and disengaging the hose end. Although such quick-disconnect couplings facilitate quickly reconfiguring pneumatic systems by changing tools, relocating hoses, etc., they are potentially hazardous when pent-up potential energy is suddenly released upon disconnection. Injuries and property damage can result from disconnected pneumatic hoses that are unrestrained and fishtail out of control. Even if no damage or injury occurs, a worker can be subjected to a sudden blast of compressed air when he or she disconnects a hose from the compressed air source or a tool from the hose.

Prior art attempts to addresses problems included Jorgensen U.S. Pat. No. 5,331,999, which discloses a pneumatic pressure relief assembly. However, heretofore there has not been available a slow-release check valve with the advantages and features of the present invention.

SUMMARY OF THE INVENTION

In the practice of the present invention, a slow-release check valve is provided for pneumatic systems including compressed gas sources, pneumatic devices and flexible hoses connecting same. The check valve includes a body with an axial passage including a seat selectively receiving a ball upon disconnection and sudden release of pressure. With the ball seated, pneumatic pressure is slowly released.

BRIEF DESCRIPTION OF THE DRAWINGS

FIG. 4 is a longitudinal, cross-sectional view of a slow-release check valve comprising a modified embodiment of the present invention.

FIG. 5 is a transverse, cross-sectional view of the modified embodiment check valve, taken generally along line 5—5 in FIG. 4.

DETAILED DESCRIPTION OF THE PREFERRED EMBODIMENTS

I. Introduction and Environment

Figure 1:
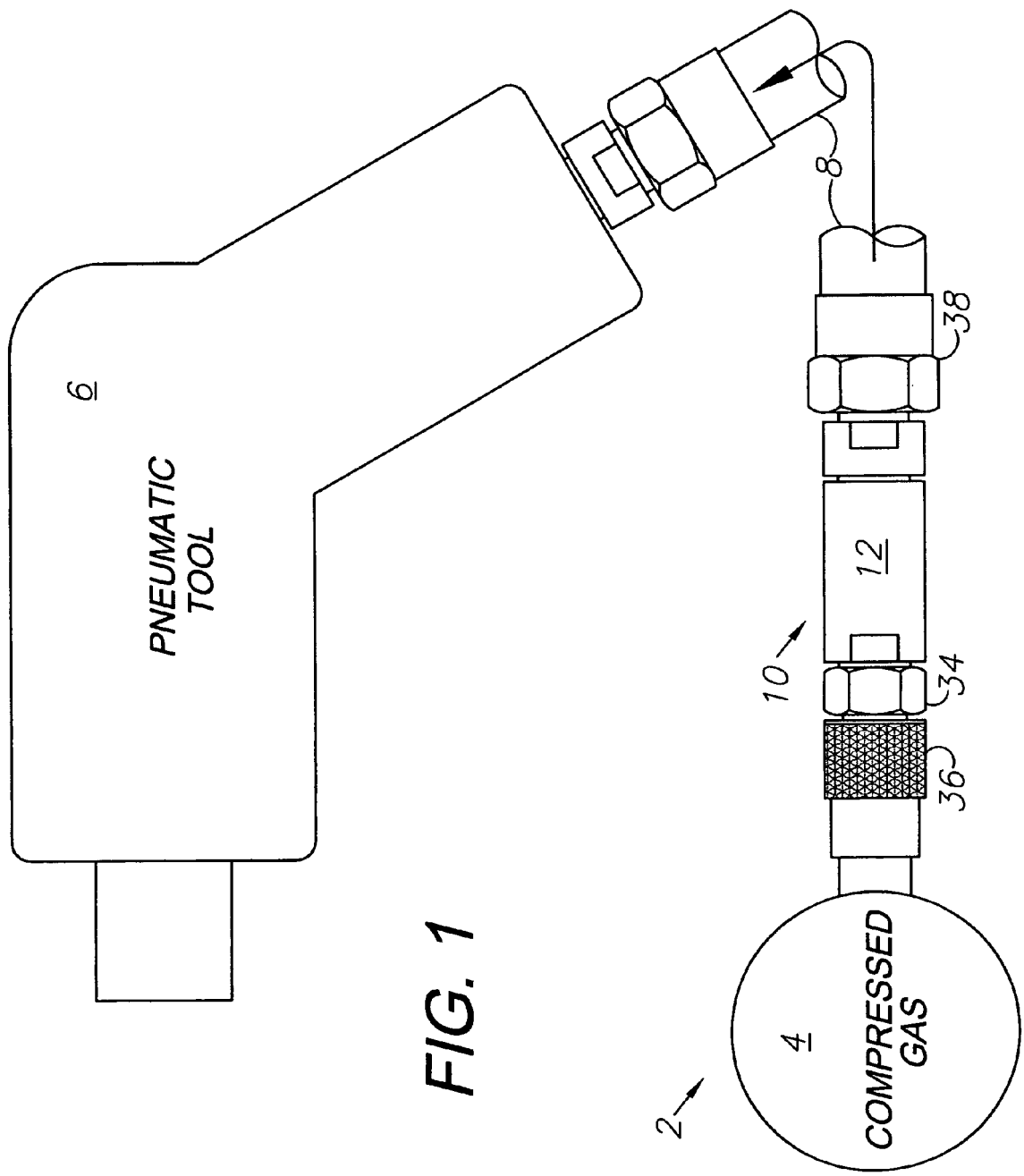
FIG. 1 shows a pneumatic system with a check valve embodying the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, up, down, front, back, right and left refer to the invention as oriented in the view being referred to. The words "inwardly" and "outwardly" refer to directions toward and away from, respectively, the geometric center of the embodiment being described and designated parts thereof. Said terminology will include the words specifically mentioned, derivatives thereof and words of similar meaning.

II. Preferred Embodiment Slow-Release Check Valve 10

Referring to the drawings in more detail, the reference numeral 2 generally designates a pneumatic system including a compressed gas source 4, a pneumatic tool 6 and a flexible hose 8. A check valve 10 interconnects the source 4 and the hose 8, but can also connect the tool 6 to the other end of the hose 8.

Figure 3:
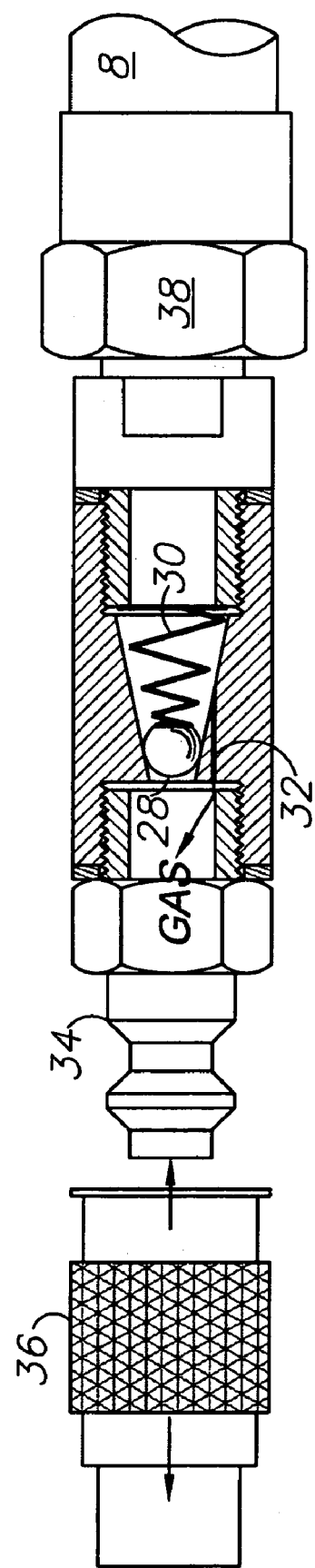
FIG. 3 is a cut away side view of the valve, shown in its closed, slow-release configuration.

The check valve 10 includes a body 12 with a proximal, supply end 14 and a distal, power end 16, each having a respective female-threaded receiver 18, 20. A frusto-conical passage 22 extends between the receivers 18, 20 and diverges from a minimum-diameter power end 24 to a maximum-and diameter supply end 26. A ball 28 is movably positioned in the passage 22 and is biased towards the supply end 24 thereof by a spring 30. The ball 28 has a diameter that is intermediate diameters of the passage ends 24, 26 whereby the ball 28 can seat in the passage 22, as shown in FIG. 3.

An optional bypass 32 extends between and interconnects the passage 22 and the supply end receiver 18. A male supply coupling 34 is threadably mounted in the body supply end receiver 18 and is adapted for selective connection to a quick-disconnect coupling 36. A male power hose coupling 38 is threadably received in the power end passage 26 and connects to an end of the hose 8. A pair of sealing washers 40 can optionally be located between the body supply end 14 and the male supply coupling 34 and between the body power end 16 and the male power hose coupling 38 for providing a gas-tight seal therebetween. Alternatively, pipe threading, joint compounds, O-rings and other sealing devices can be employed. The return spring 30 abuts the end of the hose coupling 38.

Figure 2:
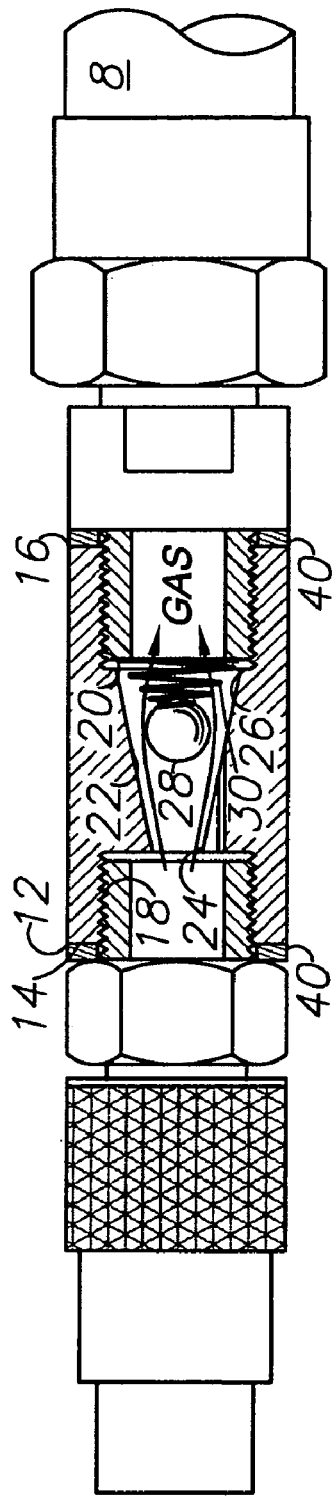
FIG. 2 is a cut-away side view of the valve, shown in its open, powered configuration.

In operation, the power configuration is shown in FIG. 2 with compressed gas freely following past the ball 28 with the spring 30 compressed. Upon disconnecting the hose coupling 38, the resulting drop in gas pressure on the supply side of the check valve 10 causes the ball 28 to seat within the passage 22 (FIG. 3). The gas pressure within the hose 8 is thereby slowly dissipated by seeping around the ball 28 and/or passing through the optional bypass 32 until ambient air pressure is reached within the hose 8. The hose 8 is thus prevented from fishtailing and potentially causing damage and injury.

III. Modified Embodiment Slow-Release Check Valve 52

A slow-release check valve comprising a modified embodiment of the present invention is shown in FIGS. 4 and 5, and is generally designated by the reference numeral 52. The valve 52 includes a body 54 with a proximate, supply end 56 having a supply receiver 58 and a distal, power end 60 having a power receiver 62. A passage 64 includes a female-threaded set screw receiver 66 adjacent to the power receiver 62 and a ball chamber 68 terminating at a seat 70 with a discharge port 72 selectively open to the supply receiver 58. As shown in FIG. 5, the ball chamber 68 has a cross-sectional configuration with multiple (e.g., four are shown) radially-spaced, longitudinally-extending channels 74, through which gas passes with the valve 52 open in a power configuration as shown in FIG. 4.

The ball chamber 68 receives a ball 76 and a return spring 78, which biases the ball 76 towards the seat 70. The return spring 78 is retained in the ball chamber 68 by a set screw 82 threadably received in the set screw receiver 66 and having a hexagonal, center opening 84 adapted to receive a hex wrench. In a closed, slow-release configuration with the ball 76 seated on the seat 70, gas pressure dissipates from the ball chamber 68 through a bypass 80 to the supply receiver 58.

It is to be understood that the invention can be embodied in various forms, and is not to be limited to the examples discussed above. Other components and configurations can be utilized in the practice of the present invention.

Having thus described the invention, what is claimed as new and desired to be secured by Letters Patent is:

1. A check valve adapted for delayed gas pressure release, which comprises:
   a body with a proximal supply end and a distal power end;
   a female-threaded supply end receiver open at said supply end;
   a female-threaded power end receiver open at said power end;
   a passage extending between and selectively communicating said receivers;
   a seat located between said passage and said supply end receiver and including a discharge port;
   said passage having a female-threaded set screw receiver adjacent to said power end receiver and a ball chamber located between said set screw receiver and said supply end receiver,
   said ball chamber having a cross-sectional configuration with a central core and multiple, radially spaced, channels each extending longitudinally from said set screw receiver to said seat and having radiused channel sides adjacent to said core and a radiused channel outermost portion, said ball chamber having supply and power ends;
   a ball movably position within said passage central core between a closed position engaging said seat in sealing relation and substantially closing said passage at said seat and an open position disengaged from said seat and substantially opening said passage;
   a return spring located entirely in said ball chamber and engaging said ball, said spring biasing said ball towards its closed position;
   a bypass extending between and communicating said supply receiver and said passage ball chamber, said bypass being adapted to dissipate gas through said valve with said ball in its closed position and said bypass being aligned with a respective said channel;
   a male-threaded set screw threadably received in said set screw receiver and having a center opening extending between and communicating said power end and said ball chamber;
   said return spring including opposite ends respectively engaging said set screw and said ball;
   said seat being located at the supply end of said ball chamber adjacent to said supply end receivers for substantially closing the supply end receiver with said ball in its closed position whereby a substantial seal is formed with said seat at a location distally space from said set screw; and
   said return spring continuously maintaining said ball in spaced relation from said seal for unimpeded flow at maximum flow rates through said valve.

2. The check valve according to claim 1, which includes:
   a male supply coupling adapted for connection to a compressed gas source and threadably received in said supply end receiver.

3. The check valve according to claim 2, which includes:
   a male power hose coupling adapted for connection to an air hose and threadably received in said power end receiver.

4. The check valve according to claim 3, which includes;
   a pair of sealing washers located between said body supply end and said male supply coupling and between said body power end and said male power hose coupling respectively.

* * * * *